United States Patent

Kodama et al.

[15] 3,638,953

[45] Feb. 1, 1972

[54] RECORDING AND REPRODUCING APPARATUS USING MAGNETIC TAPE CASSETTE

[72] Inventors: Makoto Kodama, Kanagawa-ken; Harunori Yamamoto, Tokyo, both of Japan

[73] Assignee: Sony Corporation, Tokyo, Japan

[22] Filed: May 25, 1970

[21] Appl. No.: 39,992

[30] Foreign Application Priority Data

May 29, 1969 Japan....................................44/42218

[52] U.S. Cl...........................274/4 E, 179/100.2 Z, 242/199

[51] Int. Cl...........................................................G11b 15/24

[58] Field of Search...........................274/4 E; 242/199, 200; 179/100.2 Z

[56] References Cited

UNITED STATES PATENTS

| | | | |
|---|---|---|---|
| 3,146,316 | 8/1964 | Knoth | 274/4 E |
| 3,395,871 | 8/1968 | Ackermann et al. | 274/4 E |
| 3,458,158 | 7/1969 | Ohira | 274/4 E |
| 3,475,031 | 10/1969 | Kuehnlein | 274/4 E |
| 3,494,572 | 2/1970 | Uemura | 274/4 E |
| 3,545,370 | 11/1970 | Laa | 274/4 E |

*Primary Examiner*—Leonard Forman
*Assistant Examiner*—Dennis A. Dearing
*Attorney*—Lewis H. Eslinger, Alvin Sinderbrand and Curtis, Morris and Safford

[57] ABSTRACT

In an apparatus for recording and/or reproducing signals on a magnetic tape contained in a cassette, a cassette-handling mechanism includes a cassette holder into which a cassette is slidably insertable while actuating devices that load first, second and third springs. Upon the full insertion of the cassette into the holder, the first spring force is released to shift or depress the holder and the cassette therein from an elevated position to an operative position with respect to tape-driving elements and a recording and/or reproducing head. Upon actuation of an ejection control, the force of the second loaded spring is released to return the holder and the cassette therein to the elevated position of the holder, whereupon the force of the third loaded spring is automatically released to slidably propel the cassette substantially out of the holder.

10 Claims, 8 Drawing Figures

INVENTOR.
MAKOTO KODAMA
BY
[signature]
ATTORNEY

INVENTOR.
MAKOTO KODAMA
BY
Lewis H. Eslinger
ATTORNEY

INVENTOR.
MAKOTO KODAMA

BY [signature]

ATTORNEY

INVENTOR.
MAKOTO KODAMA

BY

Lewis H. Eslinger
ATTORNEY

RECORDING AND REPRODUCING APPARATUS USING MAGNETIC TAPE CASSETTE

This invention relates generally to apparatus for recording and/or reproducing signals on a magnetic tape contained in a cassette, and more particularly is directed to an improved cassette handling mechanism by which a cassette is conveniently operatively positioned in such apparatus and ejected therefrom.

Generally, in apparatus for recording and reproducing signals on a magnetic tape contained in a cassette, the cassette is inserted horizontally into the apparatus at a level above the operative position of the cassette and, after such insertion, is vertically depressed by the user so as to attain the operative position at which the cassette is then fixedly held. Such movements of the cassette en route to its operative position are necessary in order to permit the entry into openings of the cassette of the tape driving capstan and the reel driving shafts which extend vertically upward from the base plate of the recording and reproducing apparatus.

The previously proposed cassette handling mechanisms, for example, as disclosed in U.S. Pat. No. 3,146,316, and in U.S. Pat. No. 3,395,871, have been undesirably bulky and complex in their structure and operation, and further have required the exertion of undesirably large forces for inserting a cartridge or cassette and locating the latter at its operative position.

Accordingly, it is an object of this invention to provide a recording and reproducing apparatus of the desired type with a cassette-handling mechanism by which a cassette is easily and simply disposed in its required operative position in response to the mere insertion of the cassette into the apparatus, and further by which, when desired, the cassette is easily ejected.

Another object is to provide a cassette handling mechanism, as aforesaid, in which a relatively small manually applied force is sufficient to initiate the ejection of a cassette.

Still another object is to provide a cassette-handling mechanism that permits the quick insertion and ejection of the cassette.

A further object is to provide a cassette-handling mechanism for a recording and reproducing apparatus of the described type which ensures that the operating controls, such as, the fast forward, rewind or record and playback controls, are operable to initiate the corresponding functions only after a cassette has been inserted and disposed in its operative position.

A still further object is to provide a cassette-handling mechanism which is compact so as to permit reduction of the overall dimensions of the recording and reproducing apparatus in which such mechanism is incorporated.

In accordance with a feature of this invention, an apparatus for recording and reproducing signals on a magnetic tape contained in a cassette and having a frame on which a magnetic recording and/or reproducing head and tape-driving means are mounted is provided with a cassette-handling mechanism comprising a cassette holder shiftable relative to the frame between an operative position adjacent the head and tape-driving means and a position elevated therefrom, with the holder being adapted to have a cassette slidably inserted therein while in its elevated position, first, second and third springs which are loaded in response to the insertion of a cassette into the holder, means operative upon the full insertion of a cassette in the holder to release the force of the loaded first spring and to apply such force for displacing the holder from its elevated position to the operative position, means operable upon the manual actuation of an ejection control to release the force of the loaded second spring and to apply such force for the return of the holder to its elevated position, and means operable upon the return of the holder to its elevated position to release the force of the loaded third spring and to employ such force for propelling the cassette substantially out of the holder.

The above, and other objects, features and advantages of this invention, will be apparent in the following detailed description of an illustrative embodiment thereof which is to be read in connection with the accompanying drawings, wherein.

Figure 1:
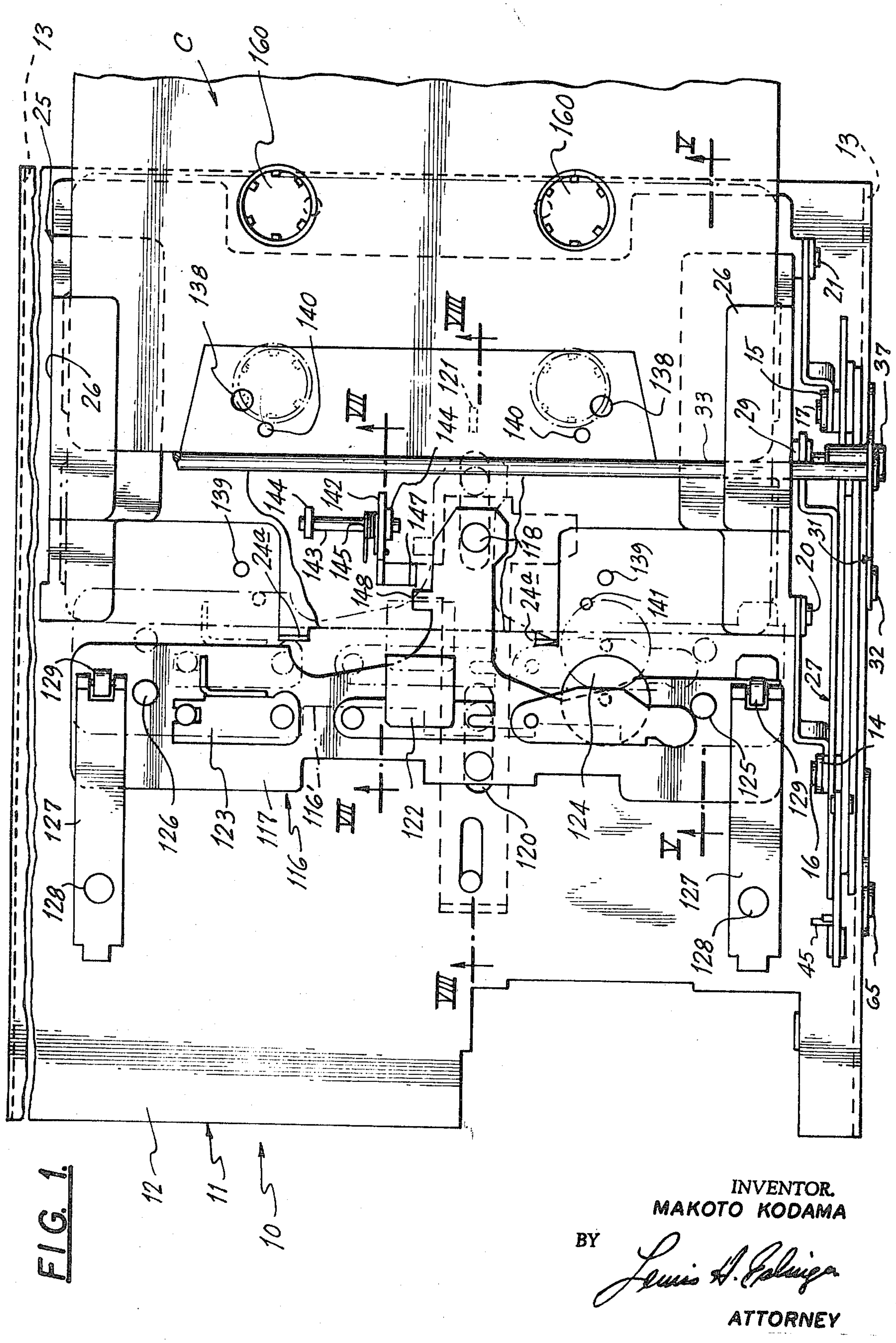
FIG. 1 is a top plan view of a portion of a recording and reproducing apparatus having a cassette-handling mechanism according to an embodiment of this invention, and which is shown with a cassette partially inserted in a holder therefor which is part of such mechanism.
Figures 2, 7, 8:
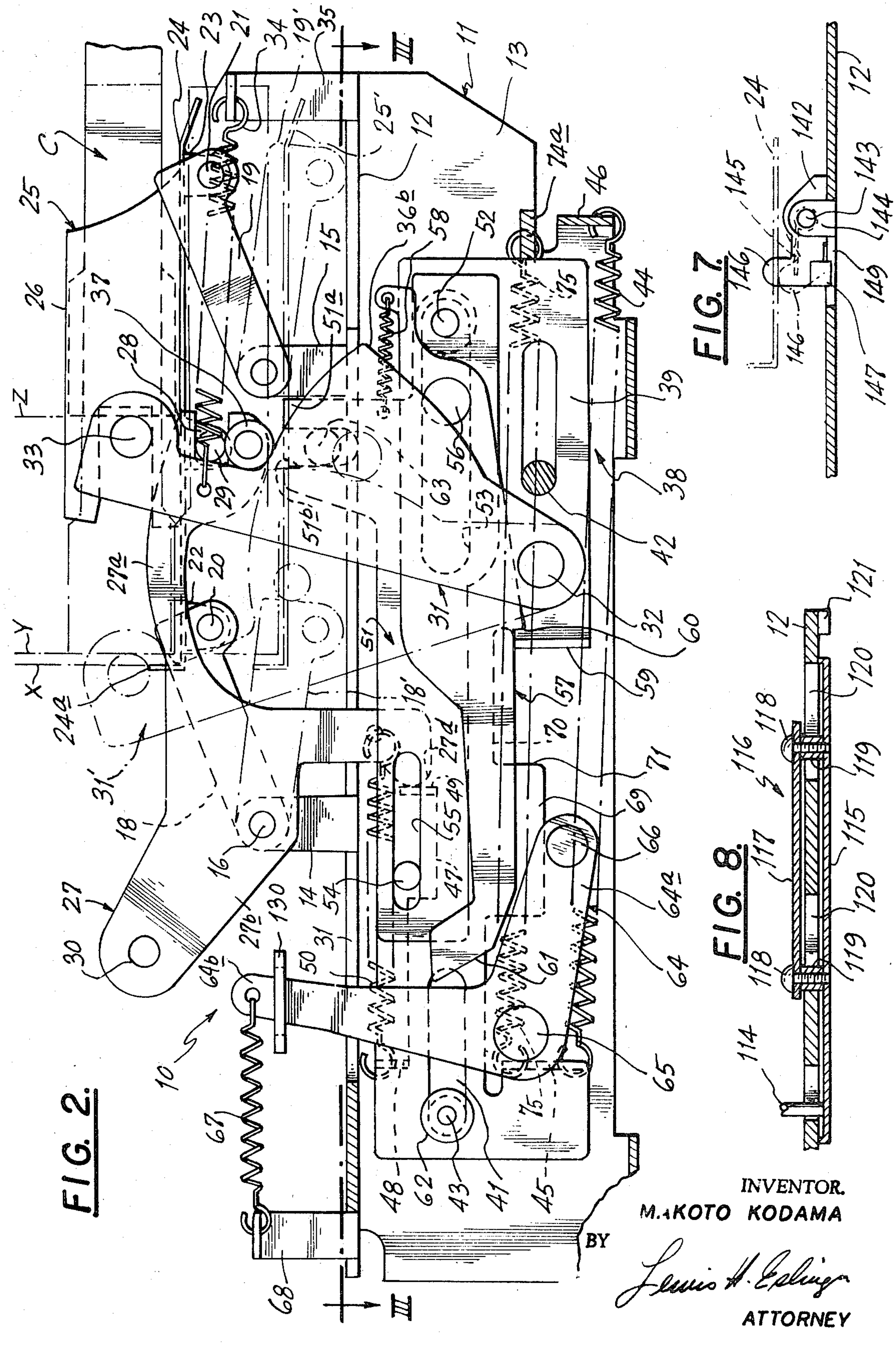
FIG. 2 is a side elevational view of the apparatus, but with a side flange of its frame removed so as to better illustrate elements of the cassette-handling mechanism.
FIG. 7 is a fragmentary sectional view taken along the line VII—VII on FIG. 1.
FIG. 8 is a fragmentary section view taken along the line VIII—VIII on FIG. 1.

Referring to the drawings in detail, and initially to FIGS. 1 and 2 thereof, it will be seen that an apparatus 10 for recording and/or reproducing signals on a magnetic tape contained in a cassette C generally comprises a frame 11 having a base plate 12 or deck with depending flanges 13 extending along the opposite sides of such base plate. Projecting upwardly from base plate 12 adjacent each of the opposite sides of the latter is a pair of ears 14 and 15 which are spaced apart along the respective side of the baseplate. The ears 14 and 15 of each pair respectively carry pivot pins 16 and 17 on which links 18 and 19 are respectively pivoted at one end thereof. The other ends of links 18 and 19 are pivotally connected to pins 20 and 21 which are carried by the tabs 22 and 23 depending from the respective side of a substantially horizontal plate 24 which is part of a cassette holder 25. The cassette holder 25 is further shown to include inwardly opening channel members 26 extending along opposite side portions of plate 24 and being dimensioned to slidably receive the respective side portions of the cassette C during insertion of the latter into holder 25. The insertion of cassette C is limited by flanges 24*a* directed upwardly from the rear edge of plate 24 so as to be engageable by the rear edge portion of the cassette that is the edge portion of the latter which is leading during insertion of the cassette into holder 25.

As is shown on FIG. 2, links 18 and 19 are movable between upwardly inclined positions and substantially horizontal positions indicated in broken lines at 18' and 19' for movement of cassette holder 25 between an elevated position, shown in full lines, and a depressed operative position adjacent to baseplate or deck 12 and indicated in broken lines at 25'.

The positioning of cassette holder 25 is controlled by bellcranks 27 lying in vertical planes that are outside the opposite sides of holder 25 and pivoted on pins 16 carried by ears 14 extending from the adjacent side portions of baseplate 12. Each of bellcranks 27 is shown to include a generally horizontally extending arm 27*a* having a bifurcated end portion defining a substantially horizontal slot 28 slidably receiving a pin 29 that projects laterally outward from the adjacent side of holder 25 so that rocking of bellcranks 27 will cause corresponding, substantially vertical displacement of engaged pins 29, and hence of holder 25. Each bellcrank 27 further includes an arm 27*b* extending in a substantially opposed direction to the respective arm 27*a* and being rigidly connected to the arm 27*b* of the other bellcrank 27 by a laterally extending rod 30. At least one of the bellcranks 27 further includes a depending arm 27*c* which extends downwardly through a slot 31 (FIG. 2) formed in the adjacent side portion of baseplate 12.

Cam arms 31 extend upwardly at the outer sides of flanges 13 and are pivotally mounted, at their lower ends, on pivot pins 32 extending from the adjacent flanges 13. The upper ends of cam arms 31 are joined by a rod 33 extending laterally therebetween at a level above plate 24 of holder 25 in the elevated position of the latter so as to be interposed in the path of a cassette C being inserted slidably into holder 25. A spring 34 is connected between each cam arm 31 and an anchoring member 35 extending upwardly from the adjacent side portion of base plate 12 so as to yieldably urge the respective cam arm 31 to the position shown in full lines on FIG. 2. Each cam arm 31 is formed with an arcuate cam surface 36*a* which is concentric with the pivoting axis of arm 31 defined by pin 32, and which is engageable by a cam follower roller 37 carried by the end portion of arm 27*a* of the adjacent bellcrank 27. So long as roller 37 rides on cam surface 36*a*, the respective bellcrank 27 is held in the position shown in FIG. 2, and thus maintains cassette holder 25 in its elevated position indicated in full lines on that view of the drawings. Each cam arm 31 is further shown to have an arcuate cam surface 36*b* extending downwardly from an end of cam surface 36*a* and along which roller 37 on the adjacent bellcrank 27 can ride when cam arm 31 has been angularly shifted to the position indicated in broken lines at 31′ on FIG. 2. The cam surface 36*b* is arcuate and has a configuration such that it will be concentric with the pivoting axis of the adjacent bellcrank 27 defined by pivot pin 16 when the cam arm has been angularly displaced to its position 31′. Thus, when cam arm 31 is moved to its position 31′, as hereinafter described, roller 37 is no longer supported on cam surface 36*a* and can move downwardly along cam surface 36*b* so that bellcrank 27 is free to rock in the clockwise direction, as viewed on FIG. 2, whereby to displace cassette holder 25 from its elevated position to its depressed or operative position indicated at 25′.

At the inside of at least one of flanges 13 there is a slide assembly 38 that includes an elongated main slide 39 having longitudinal slots 40 and 41 that slidably receive pins 42 and 43 extending from the adjacent side flange 13 so as to permit longitudinal displacement of slide 39 relative to such flange 13. A coil spring 44 is anchored at its opposite ends to a bent tab 45 extending from slide 39 and to a bent tab 46 extending from adjacent flange 13 so as to yieldably urge slide 39 forwardly, that is, toward the right as viewed on FIG. 2, to the position shown in which pins 42 and 43 are engaged by the left hand ends of the respective slots 40 and 41. A bracket 47 shown in broken lines on FIG. 2 is fixedly secured to the inner side of slide 39 and has bent end portions 48 and 49. As shown, the bent end portion 49 of bracket 47 is engageable by a nose 27*d* provided at the lower end of arm 27*c* of adjacent bellcrank 27, and a coil spring 50 is connected, at its opposite ends, to end portion 48 of bracket 47 and to arm 27*c* of the bellcrank so as to urge the latter to rock in the clockwise direction, as shown on FIG. 2, for urging nose 27*d* of such bellcrank arm into contact with end portion 49 of bracket 47.

An elongated auxiliary slide 51 is mounted on main slide 39 so as to be longitudinally movable relative to the latter, for example, by means of a pin 52 extending from one end portion of slide 51 and slideably engaging in an elongated slot 52 provided in slide 39, as shown in broken lines on FIG. 2, and a pin 54 extending from slide 39 and slidably engaging in a slot 55 formed in the other end portion of slide 51. Auxiliary slide 51 carries a pin 56 on which there is pivotally mounted a cam lever 57, and a coil spring 58 is connected, at its opposite ends, to cam lever 57 and to an upwardly directed extension 51*a* of slide 51 so as to yieldably urge cam lever 57 in the counterclockwise direction, as viewed on FIG. 2. The slide 39 is further shown to have, intermediate its ends, a laterally bent portion or flange 59 which extends under cam lever 57 and upon which the latter is urged to rest by the action of spring 58. The lower edge of cam lever 57 is formed with a step or shoulder 60 which is engageable with flange 59, as hereinafter described. The end portion of cam lever 57 remote from its pivot 56 is formed with an inclined cam surface 61 which, as hereinafter described, is engageable with a roller 62 carried by pin 43 for upwardly rocking cam lever 57 and thereby releasing its step 60 from engagement with flange 59.

The previously mentioned extension 51*a* of auxiliary slide 51 is bifurcated so as to define a vertical slot 51*b* shown in broken lines on FIG. 2 and slidably receiving a pin 63 which is fixed to the adjacent cam arm 31. Thus, slide 51 is longitudinally displaced in response to rocking of the adjacent cam arm 31.

A bellcrank 64 is provided adjacent one or each of side flanges 13 and is pivotally mounted, intermediate its ends, on a pivot pin 65 carried by the adjacent flange 13. Bellcrank 64 includes a substantially horizontal arm 64*a* which, adjacent its free end, carries a roller 66 urged upwardly against the lower edge of slide 39 by means of a spring 67 connected, at its opposite ends, to an upwardly directed arm 64*b* of bellcrank 64 and to an anchor 68 extending from base plate 12. The lower edge portion of slide 39 engageable by roller 66 includes a projection 69 spaced from flange 59 to define a downwardly opening notch 70 therebetween with a shoulder 71 at the side of notch 70 facing toward flange 59.

A bracket 72 (FIG. 4) extends laterally from one of the side flanges of frame 11 adjacent the front of the latter and carries a vertical pin 73 on which a bellcrank 74 is pivotally mounted for rocking in a horizontal plane. One arm 74*a* of bellcrank 74 is connected to an end of a coil spring 75 which, as shown in broken lines on FIG. 2, has its opposite end connected to flange 45 of slide 39 so that bellcrank 74 is yieldably urged in the counterclockwise direction, as viewed on FIG. 4, to maintain its arm 74*a* in contact with the adjacent forward end of slide 39.

In order to control its operations, the apparatus 10 is shown to have four control plungers 76, 77, 78 and 79 which are slidably mounted in a subframe or housing 80 provided at the lower front of frame 11. The plungers 76–79 are normally urged to their extended positions shown on FIG. 4, as by springs 81, and carry buttons 82 at their forward or projecting ends by which the respective plungers may be manually depressed or displaced rearwardly. The plungers 76, 77, 78 and 79 are provided to respectively initiate the ejecting, fast forward, recording and/or reproducing, and rewinding operations of apparatus 10 when the selected plunger is depressed.

Figures 4, 5, 6:
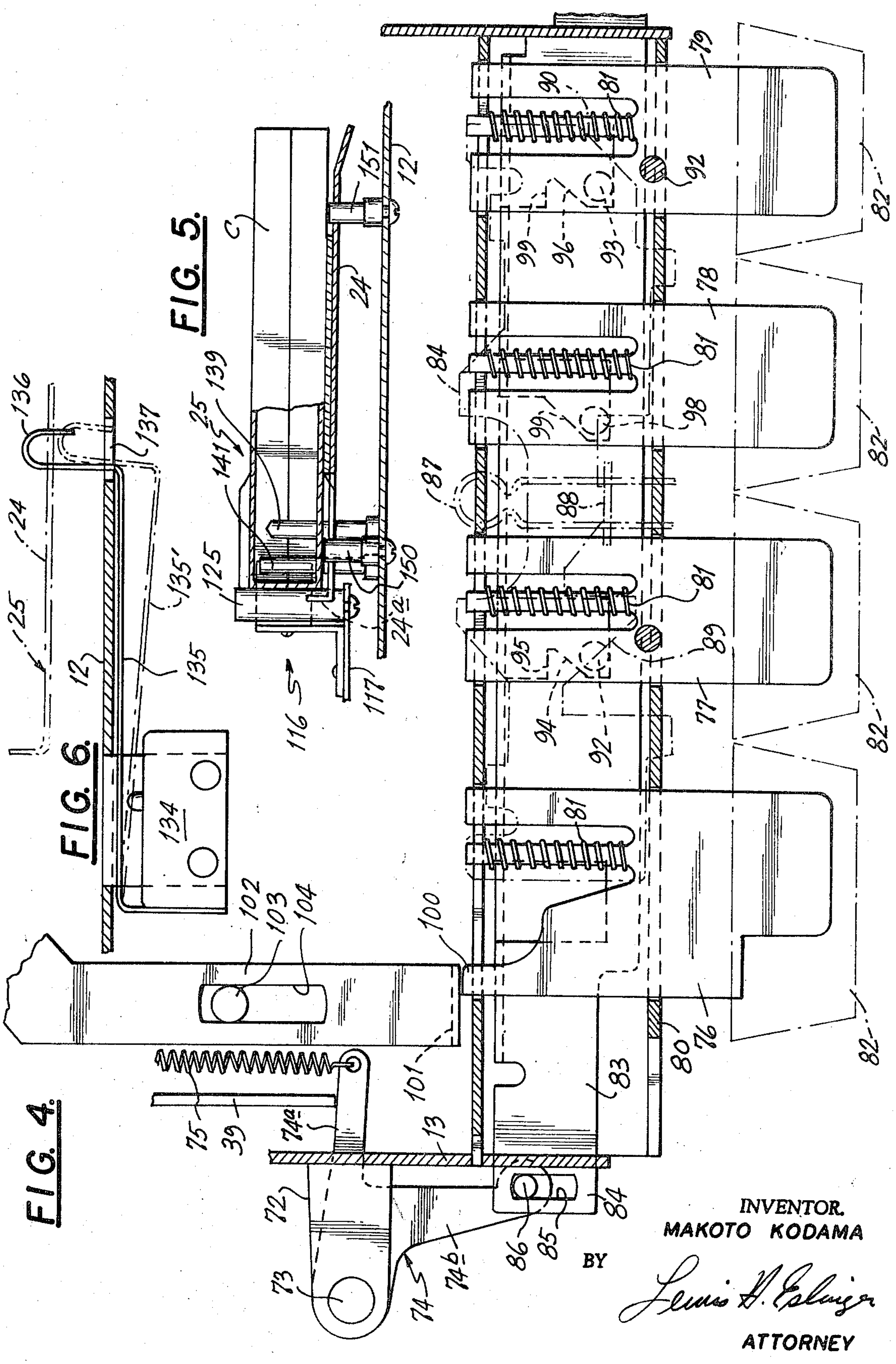
FIG. 4 is an enlarged, fragmentary top plan view, which is partly broken away and in section and which illustrates a push-button assembly to be included in the recording and reproducing apparatus having a cassette-handling mechanism according to this invention.
FIG. 5 is a fragmentary, vertical sectional view taken along the line V—V on FIG. 1, and showing a cassette disposed in its operative position.
FIG. 6 is a detail sectional view taken along the line VI—VI on FIG. 3.

Two slides 83 and 84 are laterally shiftable within subframe or housing 80 one above the other. An end portion 84 of slide 83 projects laterally out of subframe 80 and is formed with a slot 85 receiving a pin 86 carried by the forwardly extending arm 74*b* of bellcrank 74 so that the action of spring 75 on bellcrank is effective to yieldably urge slide 83 toward the right, as viewed on FIG. 4. A generally U-shaped spring 87 appearing in broken lines on FIG. 4 is fixedly mounted in subframe 80 and has its legs engaging at the opposite sides of a projection 88 extending from slide 84 whereby to yieldably urge the latter to the position shown on FIG. 4. Slide 84 further is formed with oblique edge portions 89 and 90 which are oppositely angled and disposed in the paths of rearward travel of pins 91 and 92 which project upwardly from plungers 77 and 79, respectively. Thus, when plunger 77 is depressed, pin 91 acting on oblique edge surface 89 causes shifting of slide 84 toward the right from its spring-urged position, whereas depressing plunger 79 causes pin 92 to act on oblique edge portion 90 for laterally shifting slide 84 toward the left from its spring urged position. Plungers 77 and 79 further have pins 92 and 93 depending therefrom. When plunger 77 is depressed or displaced rearwardly from the position shown on FIG. 4, its pin 92 can ride against an angled surface 94 on slide 83 to shift the latter toward the left, and then can engage in back of a stop surface 95 to prevent return of plunger 77 to its extended position provided that slide 83 is urged back to the position shown on FIG. 4 by the action of spring 75. Similarly, when plunger 79 is depressed, the pin 93 depending therefrom can ride against an angled surface 96 to shift slide 83 toward the left and then can engage in back of a stop surface 99 to prevent return of plunger 79 to its extended position provided that slide 83 is returned to the position shown on FIG. 4 by the action of spring 75. Plunger 78 also has a pin 98 depending therefrom and being engageable, when plunger 78 is depressed, with an angled surface 99 on slide 83 so as to shift the latter toward the left, as viewed on FIG. 4 against the force of spring 75. Thus, if either plunger 77 or plunger 79 has been previously depressed and locked in its depressed position by engagement of its pin 92 or 93 with the stop surface 95 or 97, the depressing of plunger 78 and consequent shifting of slide 83 is effective to release the previously depressed plunger 77 or 79.

Plunger 76, at its inner or rear end, has a leg 100 which is engageable against a flange 101 provided at the forward end of a link 102 which is movably mounted either above or below base plate 12, for example, by a pin 103 carried by such base plate and engaging in a slot 104 formed in link 102. As shown on FIG. 3, the back end of link 102 is connected by a pin 105 with one end portion of a bent lever 106 which is pivotally supported, at its other end, on a pivot pin 107 carried by base plate 12. Also pivoted intermediate its ends on pin 107 is a bellcrank 108 having angled arms 108*a* and 108*b*. The free end portion of arm 108*a* has an elongated opening 109 loosely receiving a pin 110 which extends from the armature 111 of a solenoid 112. Further, bent lever 106 carries a pin 106*a* which is engageable against arm 108*a* of bellcrank 108. Thus, bellcrank 108 is rockable in the clockwise direction, as viewed on FIG. 3, either in response to rearward displacement of link 102 upon depression of plunger 76 for manually initiating the ejecting operation of apparatus 10, or in response to retraction of armature 111 of solenoid 112, for example, upon energization of the latter.

The free end portion of bellcrank arm 108*b* has an elongated opening 113 which receives a pin 114 extending from the back end portion of an elongated member 115 disposed under baseplate 12 and forming part of a carriage 116. As shown on FIGS. 1 and 8, the carriage 116 further includes a suitably shaped plate 117 extending generally laterally above baseplate 12 and being connected with member 115, for example, by means of screws 118 which extend through spacers 119 slidable in slots 120 provided in baseplate 12. Thus, carriage 116 is movable in the fore and aft direction, for example, between the rearward or inoperative position shown in full lines on FIG. 1 and the forward or operative position indicated in broken lines at 116′ on FIG. 1, and at which the forward end of member 115 abuts against a stop 121 depending from base plate 12.

As shown on FIG. 1, plate 117 of carriage 116 carries a magnetic recording and/or reproducing head 122, a tape guide member 123, a pinch roller 124, and cassette locating pins 125 and 126 which are intended to engage and accurately locate an edge portion of the cassette when the latter is in its operative position. Two leaf springs 125 are secured adjacent their back ends, on baseplate 12 as at 128, and carry rollers 129 at their forward ends which ride on the opposite side portions of plate 117 so as to hold the latter firmly upon the top surface of baseplate 12.

Referring again to FIG. 3, it will be seen that a pair of levers 130 are disposed above baseplate 12 and are each pivotally mounted intermediate the ends of the respective lever on a pivot pin 131 carried by the baseplate. The outer end portion of each lever 130 extends over a respective side of frame 11 and has an opening 132 which loosely receives the upper portion of arm 64*b* of bellcrank 64 pivotally mounted at the respective side of the frame. The inner end portions of levers 130 overlap and are formed with registering openings 133 in which pin 114 is also loosely received.

Figure 3:
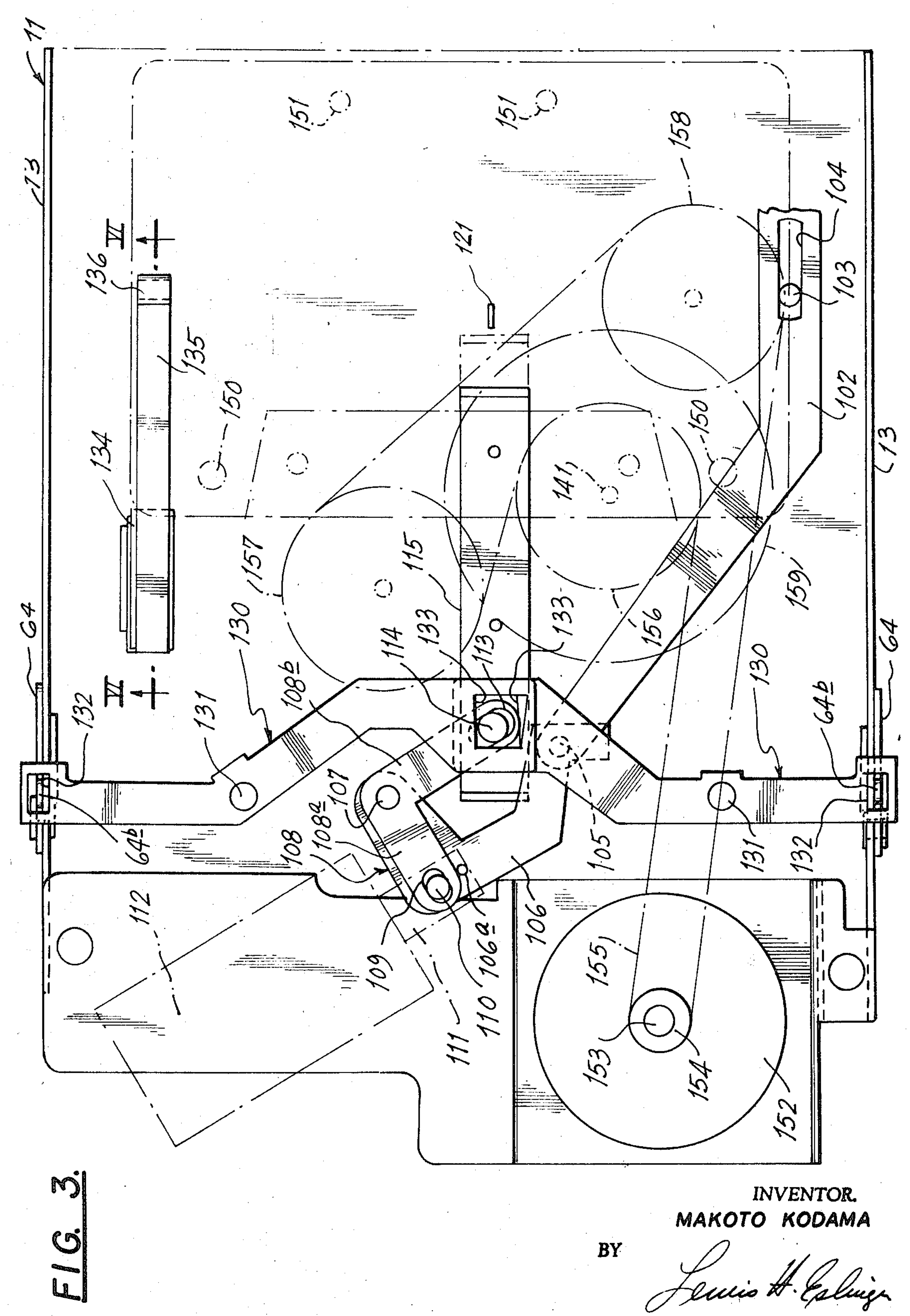
FIG. 3 is a horizontal sectional view taken along the line III—III on FIG. 2.

As shown on FIGS. 3 and 6, a switch 134 for controlling the supplying of power to other components of the apparatus 10 is mounted under baseplates 12 and has an actuating spring arm 135 with an upstanding end portion 136 which projects upwardly through an opening 137 in baseplate 12. The contacts of switch 134 are closed only when actuating arm 135 is depressed, for example, to the position indicated in broken lines at 135′ on FIG. 6. The actuating arm 135 is normally biassed to the relatively raised position shown in full lines on FIG. 6, and such actuating arm is depressed to close the contacts of switch 134 only when cassette holder 25 is depressed to its operative position where plate 24 thereof bears downwardly on portion 136 of the actuating arm.

Each cassette C intended for use in apparatus 10 has a pair of laterally spaced openings 138 (FIG. 1) which, when the cassette holder is disposed at its operative position, receive a similarly spaced apart pair of pins 139 (FIGS. 1 and 5) projecting vertically upward from baseplate 12 to fixedly locate the cassette in its operative position. Each cassette further has a pair of laterally spaced openings 140 which are suitably located so that, depending upon which face of the cassette is directed upwardly upon insertion of the cassette into holder 25, and upon disposition of cassette C at the operative position, one or the other of openings 140 will receive a capstan 141 (FIGS. 1 and 5) which also projects vertically upward from baseplate 12.

In order to prevent the movement of carriage 116 from the position shown in full lines on FIG. 1 to the operative position indicated in broken lines at 116′ except when a cassette C is disposed at the operative position thereof, a lock member 142 (FIGS. 1 and 7) is pivotally mounted on a pin 143 carried by tabs 144 extending upwardly from baseplate 12. Lock member 142 is urged in the counterclockwise direction as viewed on FIG. 7 to the position there shown, as by a torsion spring 145 (FIG. 1), and has an upward projection 146 which, in such position of lock member 142, extends above the level of plate 24 of cassette holder 25 in the operative position of the latter. Lock member 142 further has a latch portion 147 which, when lock member 142 is in the position of FIG. 7, extends into the path of forward travel of an abutment 148 (FIG. 1) extending from plate 117 of carriage 116. Thus, with lock member 142 in the position shown on FIG. 7, its latch member 147 is engageable by abutment 148 to prevent forward movement of carriage 116 to its operative position. However, when projection 146 of lock member 142 is depressed, as by engagement with plate 24 of the cassette holder upon the movement of the latter to its operative position, the consequent rocking of lock member 142 displaces latch portion 147 thereof downwardly into an opening 149 (FIG. 7) in baseplate 12, whereby latch portion 147 is removed from the path of abutment 148 and carriage 116 is then free to be moved forwardly to its operative position.

Also fixed to baseplate 12 and extending upwardly therefrom are pairs of laterally spaced supporting posts 150 and 151 (FIGS. 3 and 5) which are engageable at their upper ends with the undersurface of a cassette C adjacent the rearward and forward edge portions of the cassette when the latter is disposed in its operative position. Thus, the posts 150 and 151 establish accurately the vertical position of the cassette C at its operative position.

As shown schematically on FIG. 3, apparatus 10 may further have an electric motor 152 suitably mounted on baseplate 12 and having its shaft 153 provided with a pulley 154 secured thereon and driving a belt 155 which runs around a driven pulley 156 connected to capstan 141 and also around idler pulleys 157 and 158. A flywheel 159 may be connected with the shaft of capstan 141, and suitable conventional transmissions may be provided between idler pulleys 157 and 158 and the usual supply and takeup reel shafts (not shown).

The above-described apparatus 10 having a cassette-handling mechanism in accordance with this invention operates as follows:

Initially, the various parts of the apparatus are in the positions shown in full lines on FIGS. 1 and 2 with the holder 25 at its elevated position. A cassette C is inserted horizontally into holder 25 from the front thereof, and when the cassette has been inserted sufficiently so that its rear or leading edge portion reaches the position Z on FIG. 2, such rear edge portion engages the rod 33 extending laterally between cam arms 31. Further insertion of cassette C into holder 25 causes corresponding rearward displacement, that is, displacement toward the left as viewed on FIG. 2, of rod 33 and thereby causes counterclockwise rocking of cam arms 31. During such rocking of cam arms 31, rollers 37 ride on cam surfaces 36*a* of the cam arms so that holder 25 is maintained in its elevated position shown in full lines. During such rocking of cam arms 31, springs 34 are extended or loaded and, simultaneously, the engagement of pin 63 in slot 51*b* of auxiliary slide 51 causes displacement of the latter rearwardly or toward the left, as viewed on FIG. 2. The cam lever 57 participates in such displacement of auxiliary slide 51 by reason of its connection with the latter at pivot 56, and the engagement of step or shoulder 60 of cam lever 57 with flange 59 on slide 39 causes the latter to be also displaced rearwardly, that is, toward the left on FIG. 2. In response to such displacement of slide 39, spring 44 is extended or loaded and, simultaneously, spring 50 is also extended or loaded with end portion 49 of bracket 47 moving away from nose 27*d* of bellcrank 27 by reason of the fact that rocking of bellcrank 27 is prevented by the engagement of its roller 37 with cam surface 36*a* of the respective cam arm 31.

However, when the rear or leading edge portion of cassette C reaches the position indicated at Y, cam arms 31 are displaced to the position indicated in broken lines at 31′ and, at this position, rollers 37 ride off cam surfaces 36*a* and are then movable downwardly along cam surfaces 36*b* so as to permit rocking of bellcranks 27 in the clockwise direction, as viewed on FIG. 2, under the influence of the spring or springs 50 that have been previously loaded, as described above. Such rocking of bellcranks 27 under the influence of spring or springs 50 causes rapid downward displacement of holder 25 from its elevated position shown in full lines to its depressed or operative position indicated in broken lines at 25′ by reason of the connection of holder 25 to bellcranks 27 through the engagement of pins 29 in grooves 28. The insertion of cassette C into holder 25 is limited to the position indicated at X where the leading or rear edge portion of the cassette engages flanges 24*a* of the holder, and the indicated spacing between the positions Y and X ensures that rollers 37 can ride off cam surfaces 36*a* to release bellcranks 27 for rocking by the springs 50.

In the course of the rearward displacement of slide 39, the roller or pin 66 carried by bellcrank 64 rides off projection 69 of slide 39 and enters into notch 70 to engate shoulder 71 and thereby lock slide 39 against return displacement by the loaded spring 44. Substantially simultaneously with the engagement of pin or roller 66 with shoulder 71, the cam surface 61 on cam lever 57 engages roller 62 to pivotally raise cam lever 57 against the force of spring 58, and thereby to disengage shoulder 60 of cam lever 57 from flange 59 of slide 39.

It will be apparent from the above that the mere insertion of the cassette C into holder 25 while the latter is at its elevated position results eventually in the automatic downward displacement of the holder, with the cassette therein, to the operative position of holder 25. When cassette holder 25 is thus moved substantially vertically downward to its operative position, as described above, the bottom surface of the cassette C is supported and located at a level determined by the top surfaces of pins 150 and 151, and simultaneously pins 139 enter openings 138 of the cassette to locate the latter in the fore-and-aft and lateral directions. Further, the downward displacement of the cassette holder to its operative position cases the entry of the capstan 141 into one of the openings 140 of the cassette, and also serves to introduce the reel shafts (not shown) into the corresponding openings 160 (FIG. 1) provided in the cassette. As the cassette holder 25 attains its operative position, the plate 24 thereof bears downwardly on the projection 136 of switch actuating arm 135 so as to close the contacts of switch 134 for supplying power to the motor 152 through a suitable circuit (not shown). The attainment of its operative position by holder 25 also causes the plate 24 thereof to bear downwardly on the projection 146 of lock member 142 so as to rock the latter in the direction for moving the latching portion 147 thereof out of the path of travel of the abutment 148 on plate 117 of carriage 116.

It will also be noted that the previously described engagement of the pin or roller 66 on each bellcrank 64 in the notch 70 of slide 39 is accompanied by rocking of the respective bellcrank in the counterclockwise direction, as viewed on FIG. 2, under the influence of the corresponding spring 67. As a result of such rocking of bellcranks 64, the end portions of arms 64*b* move rearwardly, that is, toward the left as viewed on FIGS. 2 and 3, and thereby cause rocking of levers 130 in the direction to move their inner end portions forwardly or toward the right, as viewed on FIG. 3. The engagement of pin 114 in openings 133 of levers 130 effects a corresponding forward movement of member 115 of carriage 116, whereby carriage 116 is displaced forwardly to the operative position indicated in broken lines at 116′ on FIG. 1 and at which the forward end of member 115 engages stop 121. In such operative position of carriage 116, the magnetic head 122 carried thereby is engageable with the tape contained in cassette C, and further the pinch roller 124 also carried by carriage 116 is the positioned to coact with the capstan 141 in driving the tape. It is further to be noted that, in the operative position of carriage 116, locating pins 125 and 126 thereon bear against the rear edge portion of the cassette housing to take up any play between locating pins 139 and the openings 138 receiving such pins, whereby to very precisely establish the location of the cassette in its operative position.

It is further to be noted that, when cassette holder 25 with a cassette C therein is disposed in the operative position, as described above, the rearward displacement of main slide 39 to the position shown on FIG. 4 permits spring 75 to urge bellcrank 74 in the clockwise direction, as viewed on FIG. 4, whereby to dispose lateral slide 83 in the illustrated position. With lateral slide 83 thus positioned, depression of plunger 77 by its knob 82 causes its pin 92 to ride on angled surface 94 and engage in back of stop surface 95 for holding plunger 77 in its depressed position, while the engagement of pin 91 with angled surface 92 on lateral slide 84 shifts the latter toward the right. Such lateral shifting of slide 84 is effective through conventional linages (not shown) to render operative the conventional transmission (not shown) that may be provided between the idler pulley 158 and the takeup reel shaft (not shown) engaged in one of the openings 160 of the cassette so as to effect fast forwarding of the tape from the supply reel to the takeup reel within the cassette. Conversely with lateral slide 83 in the position shown on FIG. 4, depression of plunger 79 by its knob or button 82 is effective to move its pin 93 along the angled surface 96 for engagement in back of the stop surface 97 whereby to hold plunger 79 in its depressed position. Further depression of plunger 79 causes its pin 92 to act upon angled surface 90 of lateral slide 84 for shifting the latter toward the left as viewed on FIG. 4. Such lateral shifting of slide 84 is effective, through conventional linkages (not shown) to render operative the conventional transmission (not shown) between the idler pulley 157 and the supply reel shaft (not shown) engageable in an opening 160 of the cassette, and whereby fast rewinding of the tape is effected from the takeup reel onto the supply reel. Further, a suitable linkage is preferably provided between lateral slide 84 and carriage 116 to displace the latter rearwardly from its operative position whenever slide 84 is displaced laterally from the position shown on FIG. 4 in response to depression of plunger 77 or plunger 79, whereby to disengage the head 122 and pinch roller 124 from the tape in the cassette during either fast forwarding or rewinding operation.

It will be apparent that, with either the plunger 77 or the plunger 79 depressed to effect fast forwarding or rewinding, respectively, of the tape, depression of plunger 78 will cause its pin 98 to act on angled surface 99 of lateral slide 83 so as to displace the latter toward the left, as viewed on FIG. 4, and thereby to release the pin 92 or 93 from the respective stop surface 95 or 97 so as to return the plunger 77 or 79 to its forwardly extended position for halting the fast forwarding or rewinding operation. It will also be understood that the apparatus 10 is to be provided with suitable conventional controls (not shown) which, when plunger 78 is depressed, causes driving of the tape at the regular speed by the cooperative action of capstan 141 and pinch roller 124 and operation of head 122 for either recording or reproducing a signal on the driven tape.

At this point in the description of operation of apparatus 10, it may be further pointed out that the locking of one or the other of plungers 77 and 79 in its depressed position for effecting fast forwarding or rewinding operation is possible only when cassette holder 25 is disposed in its operative position. More specifically, it will be seen that, when cassette holder 25 is in its elevated position, main slide 39 is in the position shown on FIG. 2 so that its forward end acts on bellcrank 74 to rock the latter in the clockwise direction from the position shown on FIG. 4 whereby to laterally displace slide 83 toward the left from the position there shown. With slide 83 displaced toward the left from the position shown on FIG. 4, the depression of either plunger 77 or plunger 79 will not be effective to engage its pin 92 or 93, respectively, in back of stop surface 95 or 97. Thus, when the pressure to depress knob 77 or 79 is removed therefrom, the associated spring 81 will be effective immediately to return the plunger to its inoperative or forwardly extended position.

When it is desired to eject the cassette C from apparatus 10, plunger 76 is manually depressed or displaced rearwardly at its button or knob 82 to effect corresponding rearward displacement of link 102. Such displacement of link 102 rocks lever 106 and bellcrank 108 in the clockwise direction, as viewed on FIG. 3, and, through the engagement of pin 114 in slot 113, effects rearward displacement of member 115 for moving carriage 116 rearwardly to its inoperative position. Further, the engagement of pin 114 in openings 133 of levers 130 causes rocking of the latter in the directions to forwardly move their outer end portions. By reason of the engagement of arms 64*b* of bellcranks 64 in the openings 132 at the outer end portions of levers 130, the forward movement of the outer end portions of levers 130 causes each of the bellcranks 64 to be rocked in the clockwise direction, as viewed on FIG. 2, whereby to release pin or roller 66 from the shoulder 71 of slide 39. Thus, slide 39 is released for forward displacement, that is, movement toward the right as viewed on FIG. 2, under the force of the previously loaded spring 44. During such forward displacement of slide 39, end portion 49 of bracket 47 bears against nose 27*b* of the depending arm 27*c* of bellcrank 27 to rock the latter in the counterclockwise direction, as viewed on FIG. 2, so that roller 37 moves upwardly along cam surface 36 *b* of the respective cam arm 31. So long as roller 37 is engaged with cam surface 36*b*, angular return of cam arm 31 from the position indicated in broken lines at 31' to the position shown in full lines on FIG. 2 is prevented and, therefore, during forward displacement of slide 39, the latter moves relative to auxiliary slide 51. Thus, during the counterclockwise return of bellcrank 27 to the position shown in full lines on FIG. 2, the respective cam arm 31 remains in the position indicated in broken lines at 31' to avoid any interference of the lateral rod 33 with the upward movement of cassette holder 25 from its operative position to the elevated position in response to the counterclockwise rocking of each bellcrank 27. However, when bellcrank 27 attains the position shown on FIG. 2, its roller 37 moves off cam surface 36*b* and onto cam surface 36 *a* of the respective cam arm 31 whereupon each cam arm 31 is released for rapid angular displacement from the position 31' to the position shown in full lines on FIG. 2 under the influence of the previously loaded spring 34. It will be apparent that the displacement of each cam arm 31 back to the position shown in full lines on FIG. 2 causes the rod 33 to act forwardly against the rear portion of the cassette in holder 25, whereby to forwardly propel cassette C substantially out of holder 25. When thus substantially propelled out of holder 25, the cassette C may be conveniently withdrawn from the holder. Upon the return of each cam arm 31 to the position shown in full lines on FIG. 2, the engagement of pin 63 in slot 51*b* restores auxiliary slide 51 to the position relative to main slide 39 that is shown on FIG. 2.

With the return of cassette holder 25 to its elevated position, actuating arm 135 for switch 134 is restored to the position shown in full lines on FIG. 6 so as to open the contacts of switch 134 and thereby interrupt the supplying of power to operating components of apparatus 10. Further, the return of cassette holder 25 to its elevated position released lock member 142 for return to the position shown in full lines on FIG. 7 whereby its latch portion 147 is again interposed in the path of forward travel of abutment 148 on carriage 116 so as to ensure that the latter will remain in its inoperative position. Also, as previously noted, the return of main slide 39 to its foremost position shown on FIG. 2 ensures that neither plunger 77 not plunger 79 can be locked in its depressed position to effect fast forwarding or rewinding operation of apparatus 10. Thus, the mere depressing of the plunger 76 for initiating ejection of a cassette from apparatus 10 automatically effects the return of all parts of the cassette-handling mechanism to their original positions.

It is also intended that ejection of a cassette may be effected automatically, for example, when all of the tape in a cassette has been wound onto the takeup reel thereof. Such automatic ejection may be initiated by detecting a suitable leader connecting the tape to the supply reel, for example, by a photoelectric cell or suitable electrode (not shown) scanning the tape, and by suitably effecting energization of solenoid 112 in response to the detection of that leader. When solenoid 112 is thus energized to retract its armature 111, bellcrank 108 is again angularly displaced in the clockwise direction to return carriage 116 to its inoperative position and to rock levers 130 in the directions for initiating the previously described actions that cause ejection of the cartridge from its operative position.

It will be apparent that, when manually initiating the ejection of a cartridge by depressing plunger 76, a relatively small force can be employed for depressing plunger 76 and causing the described rocking of levers 130, as such rocking of levers 130 is resisted only by the relatively small force of spring 67 acting on each bellcrank 64. Further, the insertion of a cassette into holder 25 can also be effected by the exertion of a relatively small force by reason of the fact that individual springs are provided to effect the various movements of holder 25 in moving the cassette to its operative position and in ejecting the cassette from such operative position. Thus, more specifically, spring 50 only functions to move holder 25 from its elevated position to its operative position following the insertion of the cassette to the position Y in the elevated holder, spring 44 only functions to return holder 25 from its operative position to its elevated position during the initial portion of the ejecting operation, and spring 34 only function to forwardly eject the cassette from holder 25 after the latter has attained its elevated position. Thus, each of the springs 34, 44 and 50 can be designed to exert the minimum force that is consistent with the proper performance of its respective function.

Since holder 25 is spring actuated from its elevated position to its operative position by the action of spring 50 and is also spring actuated from its operative position to its elevated position by the action of spring 44, both the movement of the cassette to its operative position and the ejection of the cassette can be rapidly effected.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. In an apparatus for recording and reproducing signals on a magnetic tape contained in a cassette and having a frame on which magnetic head means and tape-driving means are mounted at a predetermined level; a cassette handling mechanism comprising a cassette holder shiftably mounted on said frame for movement between an operative position at said level of the head and tape-driving means and a position elevated therefrom, said cassette holder being shaped to have a cassette slidably inserted therein while said holder is in said elevated position, first, second and third spring means, means operative to load said first, second and third spring means in response to the insertion of a cassette into said holder at said elevated position, means operative upon the full insertion of a cassette into said holder to release the force of the loaded first spring means and to displace said holder from said elevated position to said operative position by the force of said first spring means, manually actuable ejection control means, means operable upon actuation of said ejection control means to release the force of the loaded second spring means and to return said holder to said elevated position by the force of said second spring means, and means operable upon said return of the holder to said elevated position to release the force of said loaded third spring means and to propel a cassette substantially out of said holder by the force of said third spring means.

2. An apparatus according to claim 1, in which said head means and an element of said tape-driving means are carried by a carriage movable toward and away from an operative position adjacent a cassette in said holder at said operative position of the latter, and further comprising means to move said carriage to said operative position thereof following the shifting of said cassette holder to said operative position of the latter, and lock means to prevent movement of said carriage to said operative position thereof so long as said holder is in said elevated position.

3. An apparatus according to claim 2, in which locating pins extend from said frame to enter respective openings in a cassette as the latter moves with said holder from said elevated position to said operative position of the holder, and said carriage further carries additional locating pins which, in said operative position of the carriage, bear against an edge portion of the cassette to take up any play between the first mentioned locating pins and said openings of the cassette receiving the same, whereby to precisely locate and fix said cassette relative to said head means.

4. An apparatus according to claim 1, in which manually actuable control members are provided for controlling fast forwarding and rewinding operations of said tape-feeding means, holding means are operative to hold each of said control members in an actuated position thereof, and said holding means is rendered inoperative when said cassette holder is in said elevated position.

5. An apparatus according to claim 1, in which an operating member extends laterally across said holder and is displaceable by a cassette inserted in the holder, pivoted cam arm means are connected with said operating member and are rocked in response to displacement of the latter, bellcrank means are connected with said holder to pivot in accordance with shifting of the holder between said elevated and operative positions thereof, said cam arm means has first and second cam surfaces selectively engageable by cam follower means on said bellcrank means, said first cam surface being engaged by said follower means to hold said bellcrank means in correspondence with said elevated position of the holder except when a cassette is fully inserted in said holder, said second cam surface being engaged by said follower means to permit pivoting of said bellcrank means in correspondence with shifting of said holder to said operative position only upon rocking of said cam arm means in response to full insertion of a cassette into said holder and preventing return rocking of said cam arm means until the restoration of said holder to said elevated position, said first spring means is connected with said bellcrank means to urge the latter to pivot in the direction for moving said holder to said operative position, and said third spring means is connected with said crank arm means to urge the latter to rock in the direction displacing said operating member in opposition to the insertion of a cassette into said holder.

6. An apparatus according to claim 5, in which main slide means is longitudinally displaceable relative to said frame, said second spring means is connected between said frame and said main slide means to urge the latter in one direction, auxiliary slide means is mounted on said main slide means for limited longitudinal displacement relative to the latter, said auxiliary slide means is connected with said cam arm means for longitudinal displacement in response to rocking of said cam arm means, cam lever means is mounted on said auxiliary slide means and is engageable with said main slide means to displace the latter in the opposite direction with the displacement of said auxiliary slide means in said opposite direction upon rocking of said cam arm means in response to insertion of a cassette into said holder, latching means are provided for holding said main means against return in said one direction, means are operative to disengage said cam lever means from said main slide means when the latter is held by said latching means, said first spring means is connected between said bellcrank means and said main slide means to be loaded in response to displacement of said main slide means in said opposite direction while said bellcrank means is held against pivoting by engagement of said follower means with said first cam surface, said ejection control means is operable, upon actuation thereof, to disengage said latching means from said main slide means, and said main slide means has an abutment thereon engageable with said bellcrank means to pivot the latter in the direction to raise said holder to said elevated position in response to displacement of said main slide means in said one direction.

7. An apparatus according to claim 6, in which said head means on an element of said tape-driving means are carried by a carriage movable toward and away from an operative position adjacent a cassette in said holder at said operative position of the latter, and further comprising means to move said carriage to said operative position thereof in response to operation of said latching means to hold said main slide means.

8. An apparatus according to claim 7, in which said ejection control means is also connected with said means to move the carriage for displacing the latter away from said operative position upon manual actuation of said ejection control means.

9. An apparatus according to claim 8, further comprising electromagnetic means also connected with said means to move the carriage for displacing the latter away from said operative position thereof in response to electrical energization of said electromagnetic means.

10. An apparatus according to claim 6, in which manually actuable control members are provided for controlling fast forwarding and rewinding operations of said tape feeding means, holding means are operative to hold each of said control members in an actuated position thereof, and means actuated by said main slide means when the latter is displaced in said one direction render inoperative said holding means to prevent said fast forwarding and rewinding operations when said cassette holder is at said elevated position.

* * * * *